2,762,717

VINYL SILICON COMPOUND AND METHOD OF APPLICATION TO GLASS FIBERS

Harold A. Clark, Midland, Mich., assignor to Dow Corning Corporation, Midland, Mich., a corporation of Michigan No Drawing. Application April 18, 1955,
Serial No. 502,195

6 Claims. (Cl. 117—46)

This application relates to a method of treating glass fibers with vinylsilicon compounds.

It is known that glass fibers which have been treated with various vinylsilicon compounds and thereafter dried are more organophilic in nature. Glass which has been so treated produces much stronger laminates with organic resins, particularly organic vinylic resins than the untreated glass. The increase in strength is partciularly apparent when the laminate is subjected to moist conditions. Ordinarily the flexural strength of a glass-organic resin laminate will decrease as much as 30–50% when immersed in water. After treatment with vinylsilicon compounds the retention of strength under moist conditions is at least 80%. It has been found also that treatment of the glass with these organosilicon compounds increases the strength of the organosilicon resin-glass fiber laminates.

Heretofore the vinylsilicon compounds have been applied to the glass in one of three forms. One method is treatment of the glass with vinyltrichlorosilane. This method is not commercially feasible because of the large volume of HCl evolved which creates a prohibitive corrosion problem. The second method is to treat the glass with a solution of vinylsilanols derived by the hydrolysis of hydrolyzable vinyl silanes in a medium of controlled pH. Whereas this method avoids the corrosion problem it suffers from the serious disadvantage that the aqueous solution of vinylsilanol is unstable and condenses to the polysiloxane which precipitates out in a matter of a few hours. This is true regardless of how carefully the pH is regulated. Consequently this method suffers a serious disadvantage in commercial operation.

The third method heretofore employed is that of treating the glass fibers with an aqueous solution of an alkali metal salt of vinylsilanol. This method avoids the instability of the second method but suffers from a serious disadvantage because it is necessary to remove the alkali metal from the cloth after treatment. If the alkali metal is not removed the glass cloth becomes stiff and there is a serious corrosion problem with respect to the glass. Furthermore if the alkali is not removed, the cloth cannot be used for laminating silicone resins.

The only practical way of removing the alkali metal is by washing the cloth. Besides making necessary an additional step with the resulting added cost it has proved to be quite difficult in practice to get all of the alkali metal out of the glass fibers. Consequently much of the treated cloth which comes from commercial production is still alkaline and therefore totally unsatisfactory for use with silicone resins and also gives inferior laminates with organic resins such as polyesters.

The primary object of this invention is to provide a finish for glass fibers which will give all of the beneficial results of the heretofore known methods and at the same time avoids all of the problems which the heretofore employed methods posed. Another object is to provide a solution for treating glass fibers which is stable when diluted out to treating concentrations. Another object is to provide a method of finishing glass fibers with a stable solution of a vinyl siloxane which obviates the necessity of washing the fibers or heating them excessively after treatment. Another object is to provide a treatment for glass fibers which can be satisfactorily employed in the lamination of silicone resins without the necessity of washing the fibers after treatment. Other objects and advantages will be apparent from the following description.

In accordance with this invention glass fibers are wet with a solution of a quaternary ammonium salt of monovinylsilanol, said solution having a concentration of from .01 to 1% by weight $ViSiO_{3/2}$ based on the weight of the solution and thereafter heating the fibers at a temperature of at least 100° C. until they are dry.

The quaternary ammonium salts which are operative in this invention are those of the formula $$ViSi(ONR_4)_xO_{\frac{3-x}{2}}$$

in which R is of the group monovalent hydrocarbon radicals and hydroxylated monovalent hydrocarbon radicals, the total number of carbon atoms in the four R groups on any one N atom being less than 13 and $x$ has a value from .5 to 3 inclusive. Thus it can be seen that the ratio of quaternary ammonium groups to silicon in the salts employed in this invention can range from 1 quaternary ammonium group for every 2 silicon atoms to 3 quaternary ammonium groups per silicon atom. Preferably there should be about 1 quaternary ammonium group per silicon atom.

The salts employed in this invention may be prepared by reacting the corresponding quaternary ammonium hydroxides with vinyltriethoxysilane or preferably with a monovinylsiloxane gel. The preparation is carried out by simply mixing the hydroxide and the organosilicon compound in a suitable media such as alcohol or water. The salt formed is completely soluble in the reaction medium and is then ready for use.

For the purpose of this invention the R groups can be any monovalent hydrocarbon radical such as alkyl radicals methyl, ethyl, butyl; alkenyl radicals such as vinyl, allyl, hexenyl; cycloaliphatic radicals such as cyclohexyl, cyclopentyl and cyclohexenyl; aromatic hydrocarbon radicals such as phenyl and tolyl; arlkyl hydrocarbon radicals such as benzyl and any hydroxylated derivative of these hydrocarbon radicals such as hydroxyethyl, hydroxycyclohexyl, hydroxyphenyl or hydroxyhexenyl. If desired, a mixture of two or more salts can be employed.

As stated above the salts should contain less than 13 carbon atoms attached to any one nitrogen. When the number of carbons exceeds this, the resulting salts are not water soluble or if water soluble they are not economical to use because of the large amount of organic material which is being applied to the glass relative to the amount of siloxane.

One of the primary advantages of the method of this invention is the fact that the salts employed are stable in an aqueous solution. This is important because an aqueous solution is the most economic from a commercial standpoint and because the solution employed must have a relatively low concentration and thus the silicon compound must be stable to hydrolysis and condensation. It is to be understood that other solvents such as alcohols, ketones or other organic solvents may be employed either alone or in conjunction with water.

It has been found that satisfactory results are obtained only when the concentration of the solution is between .01 and 1% by weight $ViSiO_{3/2}$. It is to be noted that the concentration of solution is based upon the weight of siloxane expressed as $ViSiO_{3/2}$ contained therein and not upon the weight of the salt. For example, in order to obtain a .1% solution with the salt $Me_4NO_2SiVi$ it would be necessary to add .2 g. of the salt per 100 g. of solution. When the concentration of the siloxane is less than .01% unsatisfactory treatment is obtained. When the concentration exceeds 1% the treated fibers are rendered stiff and unsuitable for use.

The fibers may be wet by the solution in any convenient manner such as by dipping, spraying or brushing. After the fibers have been wet, they are dried by heating at a temperature above 100° C. When the fibers are to be laminated with organosilicon resins, they should be heated at a temperature of at least 250° C. until the fibers are no longer alkaline. Heating at this temperature or above decomposes the quaternary ammonium salt so that all of the nitrogen portion of the salt is volatilized from the surface of the fibers leaving only the siloxane portion behind. This is one of the primary advantages of the method of this invention since such volatilization of the alkali cannot be accomplished when alkali metal salts are employed.

When the fibers are to be laminated with organic resins it is not essential that the heating be carried out at or above 250° C. In this case it is only necessary that the cloth be dried before lamination. However, it has been found that even with organic resins improved wet strengths of the laminates are obtained if the heating temperature approaches 250° C. This is presumably due to the fact that the alkaline material is removed from the surface of the fibers and this renders them more hydrophobic.

The time of heating is not critical except that if one wishes to remove all of the alkali from the surface of the glass the heating should be for at least 5 minutes at 250° C. At higher temperatures the heating time may be reduced but excessive temperatures, that is above 300° C., should be used with caution since there is danger of removing the vinyl groups from the silicon at extreme temperature. Flash cures at extremely high temperatures, however, can be employed provided the time of heating is short.

Glass fibers treated by the method of this invention give improved laminates with organic or organosilicon resins. In the case of the organic resins the improvement is obtained primarily in the wet strength of the laminate, that is the strength of the laminate is retained when subject to moist conditions. In the case of organosilicon resins the primary improvement is in the strength of the laminate at room temperatures. These strengths are increased by treating the glass fibers in accordance with this invention.

Any organic molding resins such as epoxy resins, phenol-aldehyde resins, polyester resins, coumarone-indene resins, rubber and any organosiloxane resin can be employed with the treated fibers of this invention. The treatment is especially adaptable for use with vinylic resins, that is those containing C=C linkages such as, for example, unsaturated polyester resins.

The following examples are illustrative only and should not be construed as limiting the invention which is properly delineated in the appended claims. All flexural strengths shown hereinafter were run at room temperature unless otherwise stated. All percentages in the examples are per cent by weight unless otherwise stated.

The term "dry strength" has reference to the flexural strength of the laminates as molded and cured. The term "wet strength" is the flexural strength after the laminate has been immersed in boiling water for 2 hours then removed, wiped dry and tested. The "retention" is the per cent of dry strength which is retained during the boiling in water.

*Example 1*

3.22 g. of a 20% methanol solution of beta-hydroxy-ethyltrimethylammoniumhydroxide (.00523 mol) was diluted with 3.22 g. of water and mixed with a solution of 1 g. of vinyltriethoxysilane (.00523 mol) in 4 g. of t-butanol. The mixture was stirred for 1 minute and a clear solution resulted. A portion of this solution was diluted with water to give a solution containing .21% by weight $ViSiO_{3/2}$ based on the weight of the solution. Heat cleaned continuous filament satin weave glass cloth was dipped into this solution and thereafter heated 5 minutes at 200° C. The treated cloth was impregnated with a mixture of a conventional polyester resin of the maleic anhydride-ethylene glycol-styrene type and .5% benzoyl peroxide. The impregnated cloth was formed into a 12-ply laminate with alternate layers of cloth at right angles to each other and thereafter molded at 10 p. s. i. at 110° C. for 15 minutes. The resulting laminate contained about 30% by weight resin.

The dry flexural strength of this laminate was found to be 71,000 p. s. i. while the wet strength was 64,350 p. s. i. which represents a 90.5% retention.

The solution of the above salt was further diluted with water to give a solution containing .105% by weight $ViSiO_{3/2}$. The same glass cloth employed above was dipped into this solution and thereafter heated 5 minutes at 250° C. The cloth was then impregnated with the polyester resin shown above, laminated and cured in the same manner. The resulting laminate had a room temperature flexural strength when dry of 71,500 p. s. i. The wet strength was 62,900 p. s. i. which represents an 88% retention.

By contrast, a blank which was run with glass cloth which had not been treated with the salt solution had a dry flexural strength of 49,700 p. s. i. and a wet strength of 11,100 p. s. i. which represents a 22% retention.

*Example 2*

38.16 g. of a 20% methanol solution of betahydroxy-ethyltrimethylammoniumhydroxide (.0624 mol) was added to 5 g. of a gel of $ViSiO_{3/2}$ (.0624 mol). The gel dissolved and the homogeneous solution was diluted to 100 g. with water to give a solution containing 5% by weight $ViSiO_{3/2}$. This stock solution was further diluted with water to give a solution containing .15% by weight of $ViSiO_{3/2}$. The glass cloth of Example 1 was dipped into the latter solution and thereafter heated 5 minutes at 150° C. The cloth was impregnated with the polyester of Example 1 and thereafter laminated as shown in that example. The dry flexural strength of the resulting laminate was 67,500 p. s i. The wet flexural strength was 60,000 p. s. i. which represents an 89% retention.

Another sample of this treated cloth was impregnated with a commercial phenol-formaldehyde resin and laminated as shown in Example 1. The resulting laminate had a dry flexural strength of 59,900 p. s. i. and a wet flexural strength of 54,600 p. s. i. which represents a retention of 91%. By contrast, the blank run employing cloth which had not been treated with vinyl salt had a dry flexural strength of 65,800 p. s. i and a wet flexural strength of 42,100 p. s. i. which represents a retention of 64%.

*Example 3*

The salt $ViSiOONMe_4$ was prepared by reacting vinyltriethoxysilane with tetramethylammoniumhydroxide by the method of Example 1. The salt was diluted to a .2 solution of $ViSiO_{3/2}$ and applied to glass cloth. The cloth was thereafter heated 10 minutes at 250° C. The treated cloth was impregnated with a commercial methylphenylpolysiloxane resin and thereafter molded at 175° C. at 30 p. s. i. and subsequently cured 12 hours at 250° C. The resulting laminate was ⅛ inch thick. The room temperature flexural strength of this laminate was 43,000 p. s. i. and the flexural strength at 500° F. was 15,100 p. s. i. By contrast, the blank run with cloth which had not been treated with the vinylsiloxane salt showed a room temperature flexural strength of 39,000 p. s. i. and a flexural strength at 500° F. of 14,000 p. s. i.

Attempts to laminate the treated cloth without heating at 250° C. failed due to premature gelation of the resin.

Example 4

Unwoven glass fibers were dipped ino an aqueous solution of the salt of Example 2, which solution contained .3% by weight VisSiO_{3/2}. The fibers were thereafter heated at 121° C. for 5 minutes. The fibers were oriented and then impregnated with a commercial unsaturated polyester resin and thereafter molded into rods in the conventional manner. The rods so formed had a dry flexural strength of 218,000 p. s. i. and a wet flexural strength of 181,000 p. s. i. This represents a retention of 83%.

Example 5

The salt of ViSiOONMe_3(CH_2C_6H_5) was prepared in accordance with the method of Example 2 and diluted with water to give .2% by weight ViSiO_{3/2}. The glass cloth of Example 1 was dipped into this solution and thereafter cured 10 minutes at 250° C. This cloth was successfully employed in preparing laminates with commercial phenylmethylsiloxane resins and with commercial unsaturated polyester resins.

Example 6

When glass cloth is treated with an aqueous solution of the salt ViSi(ONMe_4)_3, said solution having a concentration of .2% ViSiO_{3/2} in accordance with the procedure of Example 1, improved laminates are obtained.

Example 7

When glass cloth is treated with an aqueous solution of the following salts in accordance with the procedure of Example 1, improved laminates are obtained.

HOC_2H_4(C_6H_4CH_2)Me_2NOH
(HOC_2H_4)_3MeNOH
(C_6H_5)Me_3NOH

That which is claimed is:

1. A method which comprises wetting glass fibers with a solution of a salt of the formula

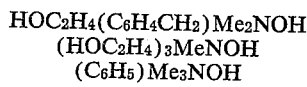

in which R is selected from the group consisting of monovalent hydrocarbon radicals and hydroxylated monovalent hydrocarbon radicals, there being less than a total of 13 carbon atoms in the R groups attached to any one nitrogen atom, and x has an average value of .5 to 3 inclusive, said solution having a concentration of from .01 to 1% by weight ViSiO_{3/2} based on the weight of the solution and thereafter heating the treated fibers at a temperature of at least 100° C. until the fibers are dry.

2. A method of treating glass fibers which comprises wetting the glass with an aqueous solution of

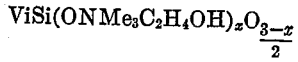

in which x has a value from .5 to 3 inclusive, said solution having a concentration of from .01 to 1% by weight ViSiO_{3/2} based on the weight of the solution, and thereafter heating the treated fibers at a temperature of at least 100° C. until the fibers are dry.

3. A method which comprises wetting glass fibers with a solution of a salt of the formula

in which R is selected from the group consisting of monovalent hydrocarbon radicals and hydroxylated monovalent hydrocarbon radicals, there being less than a total of 13 carbon atoms in the R groups attached to any one nitrogen atom, and x has an average value of .5 to 3 inclusive, said solution having a concentration of from .01 to 1% by weight ViSiO_{3/2} based on the weight of the solution and thereafter heating the treated fibers at a temperature of at least 250° C. until the fibers are no longer alkaline.

4. A method of treating glass fibers which comprises wetting the glass with an aqueous solution of

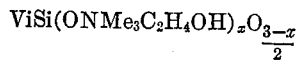

in which x has a value from .5 to 3 inclusive, said solution having a concentration of from .01 to 1% by weight ViSiO_{3/2} based on the weight of the solution, and thereafter heating the treated fibers at a temperature of at least 250° C. until the fibers are no longer alkaline.

5. A composition of the formula

in which R is selected from the group consisting of monovalent hydrocarbon radicals and hydroxylated monovalent hydrocarbon radicals, there being less than a total of 13 carbon atoms in the R groups attached to any one nitrogen atom, and x has an average value from .5 to 3 inclusive.

6.

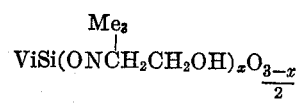

in which x has an average value from .5 to 3 inclusive.

No references cited.